(12) United States Patent
Finn et al.

(10) Patent No.: US 8,839,023 B2
(45) Date of Patent: Sep. 16, 2014

(54) TRANSMITTING NETWORK INFORMATION USING LINK OR PORT AGGREGATION PROTOCOLS

(75) Inventors: Norman Finn, Livermore, CA (US); Samer Salam, Vancouver, CA (US); Ali Sajassi, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 248 days.

(21) Appl. No.: 12/932,947

(22) Filed: Mar. 10, 2011

(65) Prior Publication Data

US 2012/0233492 A1      Sep. 13, 2012

(51) Int. Cl.
*G06F 11/00* (2006.01)
*H04L 12/713* (2013.01)
*H04L 12/709* (2013.01)
*H04L 12/751* (2013.01)

(52) U.S. Cl.
CPC .............. *H04L 45/586* (2013.01); *Y02B 60/33* (2013.01); *H04L 45/026* (2013.01); *H04L 45/245* (2013.01)
USPC .......................................... 714/4.3; 714/4.1

(58) Field of Classification Search
USPC ........................................................ 714/4.3
See application file for complete search history.

(56) References Cited

U.S. PATENT DOCUMENTS

| | | | |
|---|---|---|---|
| 5,959,958 A | 9/1999 | Inatani et al. | |
| 5,959,968 A | 9/1999 | Chin et al. | |
| 6,163,543 A | 12/2000 | Chin et al. | |
| 6,298,061 B1 | 10/2001 | Chin et al. | |
| 7,486,697 B2 * | 2/2009 | Fernandes et al. | 370/468 |
| 7,639,605 B2 * | 12/2009 | Narayanan et al. | 370/219 |
| 7,864,818 B2 | 1/2011 | Fong et al. | |
| 7,876,764 B2 * | 1/2011 | Binetti et al. | 370/395.53 |
| 2004/0098501 A1 | 5/2004 | Finn | |
| 2005/0063395 A1 * | 3/2005 | Smith et al. | 370/399 |
| 2006/0020854 A1 * | 1/2006 | Cardona et al. | 714/13 |
| 2007/0081557 A1 * | 4/2007 | Binetti et al. | 370/469 |
| 2007/0183313 A1 * | 8/2007 | Narayanan et al. | 370/216 |
| 2007/0268903 A1 * | 11/2007 | Nakagawa | 370/392 |
| 2008/0095189 A1 * | 4/2008 | Frazier et al. | 370/469 |
| 2009/0252036 A1 | 10/2009 | Fong et al. | |
| 2010/0157893 A1 * | 6/2010 | Lee et al. | 370/328 |
| 2010/0180171 A1 * | 7/2010 | Liu et al. | 714/748 |
| 2010/0293408 A1 * | 11/2010 | Shannon et al. | 714/4 |
| 2011/0019550 A1 * | 1/2011 | Bryers et al. | 370/235 |
| 2012/0266013 A1 * | 10/2012 | Shannon et al. | 714/4.2 |

* cited by examiner

*Primary Examiner* — Kamini Patel
(74) *Attorney, Agent, or Firm* — Cindy Kaplan

(57) ABSTRACT

In one embodiment, a method includes receiving at a network device, a packet from a component in a virtual network device, the packet transmitted across a link aggregation bundle connecting the virtual network device to the network device and indicating if the component is a master component in the virtual network device, and determining if an error exists in operation of the component as the master component or a slave component. An apparatus for assigning services to physical links in an aggregated link bundle is also disclosed.

17 Claims, 5 Drawing Sheets

TRANSMITTING NETWORK INFORMATION USING LINK OR PORT AGGREGATION PROTOCOLS

TECHNICAL FIELD

The present disclosure relates generally to link and port aggregation protocols, and more particularly, transmitting network information using link or port aggregation protocols.

BACKGROUND

It is important that service providers have reliable Network-Network Interfaces (NNIs) to pass service instances between providers. In order to achieve the desired reliability, multiple point to point links are typically used. The links terminate at multiple network devices in each service provider's network. Two or more network devices in the provider's network may be coupled together to appear as a single virtual network device. Multiple communication links between the network devices may also be bundled together to operate as a single virtual link. This technique minimizes the complexity of the interactions between the providers, however, there are also drawbacks with this technique.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
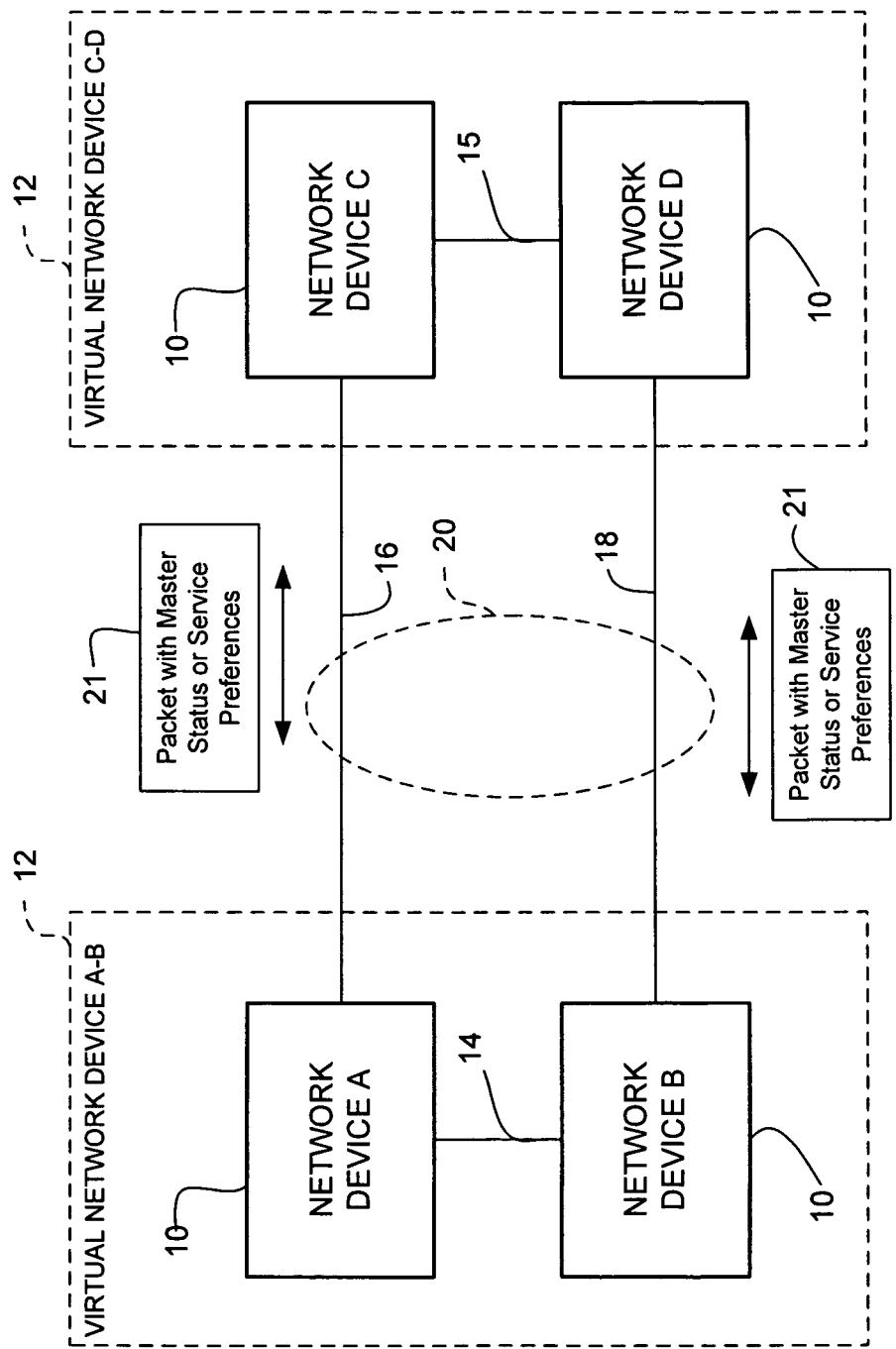
FIG. 1 illustrates an example of a network in which embodiments described herein may be implemented.

In one embodiment, a method generally comprises receiving at a network device, a packet from a component in a virtual network device, the packet transmitted across a link aggregation bundle connecting the virtual network device to the network device, and indicating if the component is a master component in the virtual network device. The method further comprises determining if an error exists in operation of the component as the master component or a slave component.

In another embodiment, an apparatus generally comprises a processor for defining preferences for assigning services to physical links in an aggregated bundle of physical links connecting the apparatus to a network device, and transmitting a packet comprising said preferences to the network device. The apparatus further includes memory for storing said preferences.

Example Embodiments

The following description is presented to enable one of ordinary skill in the art to make and use the embodiments. Descriptions of specific embodiments and applications are provided only as examples and various modifications will be readily apparent to those skilled in the art. The general principles described herein may be applied to other embodiments and applications. Thus, the embodiments are not to be limited to those shown, but are to be accorded the widest scope consistent with the principles and features described herein. For purpose of clarity, features relating to technical material that is known in the technical fields related to the embodiments have not been described in detail.

Network devices are interconnected by communication links for transmitting data packets through physical ports. In order to provide redundancy or bandwidth, some networks bundle multiple physical links to operate as a single virtual link or logical channel. The group of physical links in the virtual link is referred to herein as a link aggregation (or link) bundle. Protocols that may be used to bundle two or more physical links or ports together to form a single logical channel include Port Aggregation Protocol (PAgP) and IEEE 802.1AX Link Aggregation Control Protocol (LACP). These protocols are referred to generally herein as link aggregation protocols and it is to be understood that other protocols may be used without departing from the scope of the embodiments.

In order to improve network reliability, two or more network devices may be grouped together using, for example, virtual port channel (VPC) or virtual switching system (VSS), to form a virtual network device (e.g., virtual switch) that appears to the network devices in the network to be a single network device. The network devices (components) within the virtual network device communicate via one or more links referred to herein as inter-switch links.

The embodiments described herein transmit network information over the link bundles using a link aggregation protocol. In one embodiment (referred to herein as master convergence), information identifying a master physical component of a virtual network device is transmitted across the link bundle so that connectivity can be maintained following an inter-switch link failure or other error in operation of one or more components of the virtual network device as a master component or a slave component. The embodiments may be used, for example, to improve connectivity in multiple failure scenarios.

In another embodiment (referred to herein as service preferences), the network information identifies preferences for assigning services (e.g., VLANs (virtual local area networks)) to physical links in the link aggregation bundle. Use of per-service aggregation preferences provides improved overall efficiency in the network by reducing hop count and improving the behavior of the network in many failure scenarios.

The following provides examples in which one or more of the embodiments described herein may be implemented, followed by details of the master convergence embodiments, and then details of the service preferences embodiments.

The embodiments operate in the context of a data communication network including multiple network elements. Referring now to the figures, and first to FIG. 1, an example of a network that may implement embodiments described herein is shown. For simplification, only four network devices (A, B, C, D) 10 are shown. The network devices 10 may be switches, bridges, routers, or any other type of network device operable to perform forwarding, switching, or routing functions. In one example, network devices A and B are in a first provider's network and network devices C and D are in a second provider's network. Network devices A and C are connected by a link (e.g., network-network interface (NNI)) 16, and network devices B and D are connected by another link (e.g., NNI) 18. The links 16, 18 are grouped together in a virtual data transmission channel (e.g., EtherChannel or other link aggregation bundle) 20. For example, link bundle 20 may comprise multiple physical or virtual links using Port Aggregation Protocol (PAgP) or IEEE 802.1AX Link Aggregation Control Protocol (LACP).

In the example shown in FIG. 1, network devices A and B form a virtual network device (e.g., virtual switch A-B) 12 and are connected by inter-switch link 14. Network devices C and D form another virtual network device (e.g., virtual switch C-D) 12 and are connected by inter-switch link 15. The virtual switches appear as a single switch to the other network devices in the network.

It is to be understood that the network shown in FIG. 1 is only one example, and that networks having different network devices or topologies may be used without departing from the scope of the embodiments. For example, the network may include only one virtual network device (e.g., virtual switch A-B) 12 in communications with a single network device 10 via link aggregation bundle 20. Also, the virtual network device 12 may comprise two separate network devices (components) 10, as shown in FIG. 1, or may include a single network device comprising two modules (components) (e.g., chassis). As described below, one component of the virtual network device 12 operates as a master while the other components operate as a slave.

Control packets (e.g., link aggregation protocol data units (PDUs)) 21 are transmitted over the link aggregation bundle 20 and used in transmitting master convergence or service preference information, as described below.

Figure 2:
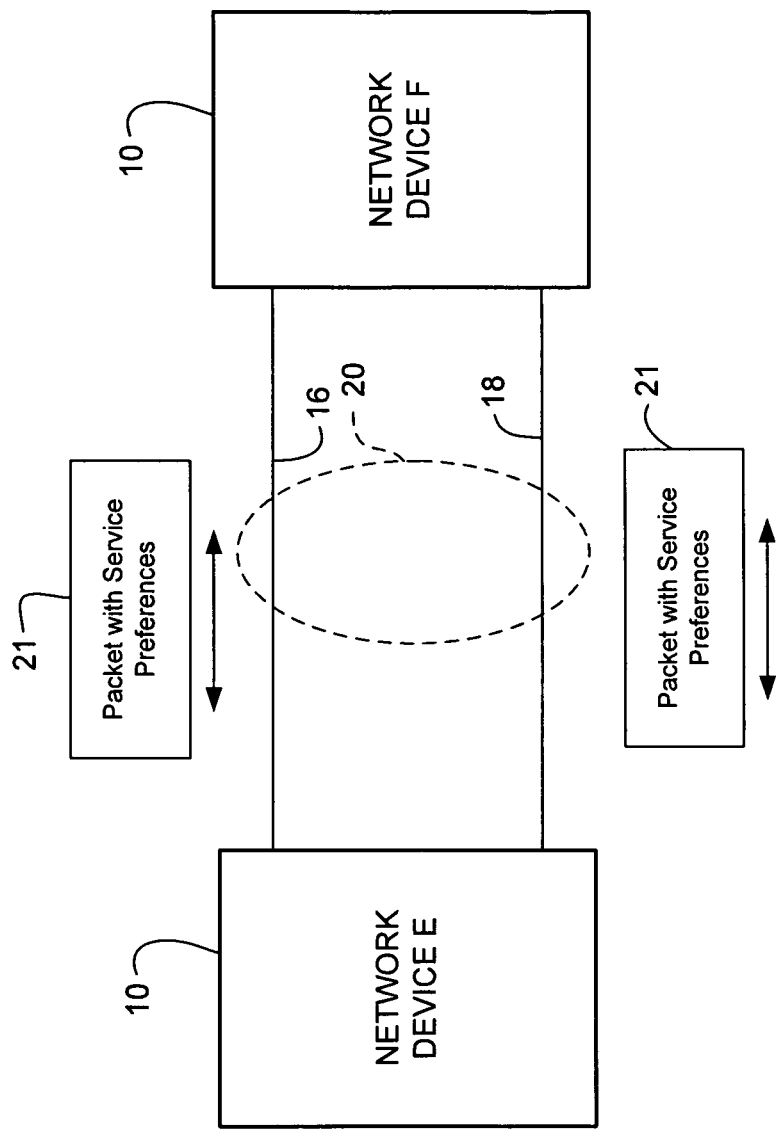
FIG. 2 illustrates another example of a network in which embodiments described herein may be implemented.

FIG. 2 illustrates another example of a topology that may be used to implement one or more of the embodiments described herein. In this example, network device E and network device F are connected by link bundle 20 comprising physical links 16 and 18.

Figure 3:
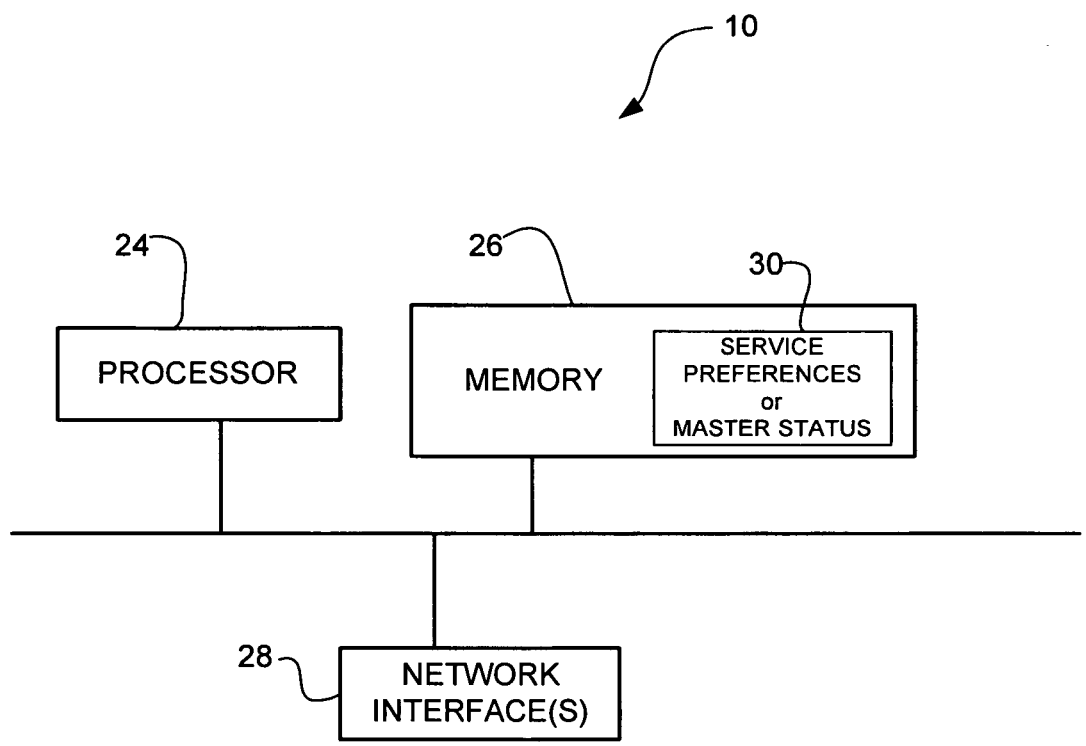
FIG. 3 depicts an example of a network device useful in implementing embodiments described herein.

An example of a network device 10 that may be used to implement embodiments described herein is shown in FIG. 3. In one embodiment, the network device 10 is a programmable machine that may be implemented in hardware, software, or any combination thereof. The device 10 includes one or more processors 24, memory 26, and one or more network interfaces 28. The memory may store data or codes for use with the embodiments described herein, including for example, service preferences or master status information 30.

Memory 26 may be a volatile memory or non-volatile storage, which stores various applications, modules, and data for execution and use by the processor 24. Logic may be encoded in one or more tangible computer readable media for execution by the processor 24. For example, the processor 24 may execute codes stored in a computer readable medium such as memory 26. The computer readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. The network interface 28 may comprise one or more wired or wireless interfaces (line cards, ports) for receiving signals or data or transmitting signals or data to other devices.

It is to be understood that the network device 10 shown in FIG. 3 and described above is only one example and that different configurations of network devices may be used.

Master Convergence

In the example shown in FIG. 1, information identifying a master component (e.g., switch) 10 within each virtual switch 12 is used to allow communication to continue between the virtual switches in the case of multiple failures (e.g., both inter-switch links 14, 15). The information may also be used to prevent communication errors in the case of a single failure. For example, if one of the inter-switch links (e.g., 14) fails and both network devices (A and B) 10 attempt to become the master switch, the remote network device (e.g., virtual switch C-D, network device C or D) can identify the error and alert an operator or treat one of the network devices (A or B) as the sole master device.

In the following example, network device (e.g., switch) A is the master switch for the virtual switch A-B and network device (e.g., switch) D is the master switch for the virtual switch C-D. If inter-switch link 14 fails, switch B (slave) and link 18 are shut down. The two provider networks continue to be connected via the switch A—link 16—switch C path. However, the master switch A at virtual switch A-B is not communicating directly with the master switch D at virtual switch C-D. If there is no change to the master/slave components at virtual switch C-D, a second failure at inter-switch link 15 will shut down communication between the two provider networks. For example, if switch D remains the master switch and switch C the slave switch, and inter-switch link 15 fails, switch C (slave) and link 16 will be shut down and there will no longer be a communication path between the two provider networks.

The embodiments described herein prevent this second failure from shutting down communication between the two provider networks by passing information identifying the master component of the virtual switch so that the virtual switch can detect whether there is a physical link between the master components. In the above example, the master switch 10 would determine that there is no physical connection between the master components (switch A and switch D) and transmit an error notification to the system administrator. The administrator can then, for example, reconfigure the switches at virtual switch C-D (i.e., make switch C the master switch and switch D the slave switch). The virtual switch C-D may also automatically reconfigure which switch 10 is the master switch based on the information received in the control packet 21 from virtual switch A-B. If there is a second failure at inter-switch link 15, switch D (slave switch) is shut down and switch A (first provider network) continues to pass data to switch C (second provider network) via link 16.

As noted above, the master status information may also be used to identify an error at the virtual network device 12. For example, if network device 10 is connected to the master and slave components of the virtual network device 12 through link bundle 20 and receives information that both components of the virtual network device 12 are set as master devices or slave devices then the network device 10 can notify a system administrator of the error or request one component to operate as the master and the other as the slave.

In one embodiment, the master information is transmitted in a link aggregation protocol data unit (PDU) (e.g., packet carrying LACP or PAgP information). The PDU may be modified to include two extra bits of information. One bit specifies that the PDU is (e.g., 1) or is not (e.g., 0) transmitted from a component of the virtual switch and another bit specifies that the PDU is (e.g., 1) or is not (e.g., 0) being transmitted from the master component of the virtual switch. The bit may be carried, for example, in a TLV (type-length-value) field or a reserved field in a LACP or PAgP packet.

Figure 4:
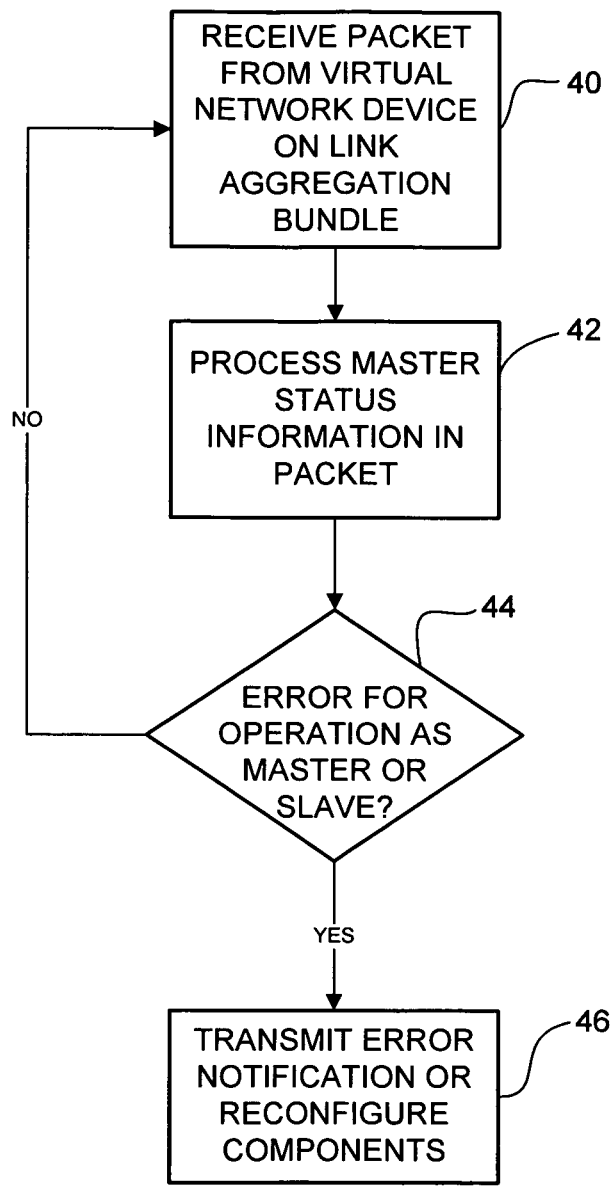
FIG. 4 is a flowchart illustrating a process for transmitting master status information between network devices, in accordance with one embodiment.

FIG. 4 is a flowchart illustrating an overview of a process for transmitting master convergence information across a link bundle, in accordance with one embodiment. At step 40, a network device receives packet 21 from a component of virtual network device 12 on link aggregation bundle 20 (FIGS. 1 and 4). The network device may be a single network device 10 or a network device or component within a virtual network device 12. The network device processes the packet comprising information identifying the component as part of the virtual network device and indicating if the component is a master component of the virtual network device (step 42). The network device determines, based on the information received in the packet, if an error exists in operation of the component as a master component or slave component (step 44). The error may be, for example, that a physical link does not exist between the master components at two virtual network devices. In this case a different component at the virtual network device should operate as the master component. The error may also be, for example, that more than one (i.e., two or more) or less than one (i.e., none) of the physical components are identified as master components at the virtual network device. In this case the components should be reconfigured so that only one component is identified as the master component. If an error exists, the network device may transmit an error notification to a network administrator or reconfigure which component operates as the master component (step 46).

Service Preferences

When LACP/PAgP bundles are employed, it is up to the transmitting device to allocate a given packet to a physical link 16, 18 in a manner such that all of the packets belonging to a given flow are transmitted over the same physical link. If the packets of a single flow (e.g., conversation) were distributed over multiple physical links in the link aggregation bundle 20, there would be a good chance that the packets would be delivered out of order, which is undesirable. Also, service providers often have a preference that all of the frames for any given customer service take the same physical link so that the proper performance management (such as delay, jitter, and loss measurements) can be performed on a per customer (VLAN) basis. For a similar reason, it is usually preferred that both directions of a given user's data use the same physical link. Depending on the physical connections within a provider's own network, the virtual network device 12 may have a definite preference about which of the physical network devices 10 it would prefer to receive any given customer service. For example, if network device C, but not network device D has a number of connections to VLANs 1, 2, and 3, then it might want the virtual switch A-B to use link 16 for those services, rather than link 18, provided that the choice makes no impact for the first provider's network efficiency. Preferences may also be used to select links 16, 18 in a bundle 20 connected at one or both ends by a single network device, as shown in FIG. 2.

In one embodiment, the services are divided into sets and preferences for the sets transmitted using the link aggregation packets 21. Grouping the services into sets is useful since there may be millions of services crossing a network-network interface, for example.

The two virtual network devices 12 (FIG. 1), network devices 10 (FIG. 2), or virtual network device 12 and network device 10 are preferably configured with some degree of agreement as to what constitutes each set. The two virtual network devices 12 may each have different definitions of the sets, with each virtual network device informing the other virtual network device of what services it needs when it tells the other virtual network device that it needs a certain set. For example, set number two at virtual switch A-B may not correspond to set number two at virtual switch C-D.

In one embodiment, each network device constructs and transmits a database assigning each of the services to zero or one of the sets. The number of sets is preferably not too large so that the preferences fit into a single aggregation protocol data unit. In one embodiment, the database is compressed, using for example, Lempel-Ziv-Welch compression, and transmitted via an IPsec (Internet Protocol security) TCP (Transmission Control Protocol) connection between two preconfigured IP addresses. The database may be identified with a database ID.

After the sets are established and the database transmitted to the remote network device, the network device includes service preferences in the link aggregation PDU. In one embodiment, the PDU includes a bidirectional preference indicator, the database ID, and the list of set preferences. The list of preferences may include, for example, zero or more pairs of: a set number identifying a set of service identifiers; and a preference level. In one example, the preference levels may be as follows:

0—Preference for this set not important;
1—Assignment of this set to link is preferred.

If the preference level is 1, assignment of the set to the link will make delivery more efficient in the network of the device transmitting the preference. There may also be more than two preference levels (e.g., no preference, not important, efficiency). The bidirectional preference indicator indicates whether the sender of the PDU prefers that all service (e.g., VLAN) assignments are the same in both directions (e.g., 0—no preference that assignments are same in both directions, 1—assignment same in both directions preferred). The database identifier removes ambiguity when a request is made at about the same time that the database is being updated. The preference information may be included, for example, in a TLV or reserved field in an LACP or PAgP PDU.

If either virtual switch (or network device) sets the bidirectional preference indicator in the PDUs on any of the physical links, then each virtual switch attempts to transmit each service on the same link as the other virtual switch. If the preference levels are different at each virtual switch, the highest level preference wins (e.g., efficiency preference level). If the preference levels are the same, then a tie breaker may be used (e.g., switch with lowest numerical system ID from PAgP or LACP wins). If the network device transmitting the preference indicates conflicting preferences (i.e., the same set is included in the PDUs on two different physical links), the receiver can choose which preference to use.

If the bidirectional preference indicators are all 0, then each virtual switch attempts to comply with the other virtual switch's preferences. Conflicts are most likely to arise if a virtual switch has to transfer data across its inter-switch link in order to comply with the other virtual switch's preferences. The final choice is up to the transmitter of the data packet. The virtual switch (or network device) can express a preference, but it should be prepared to receive any service on any physical link.

Figure 5:
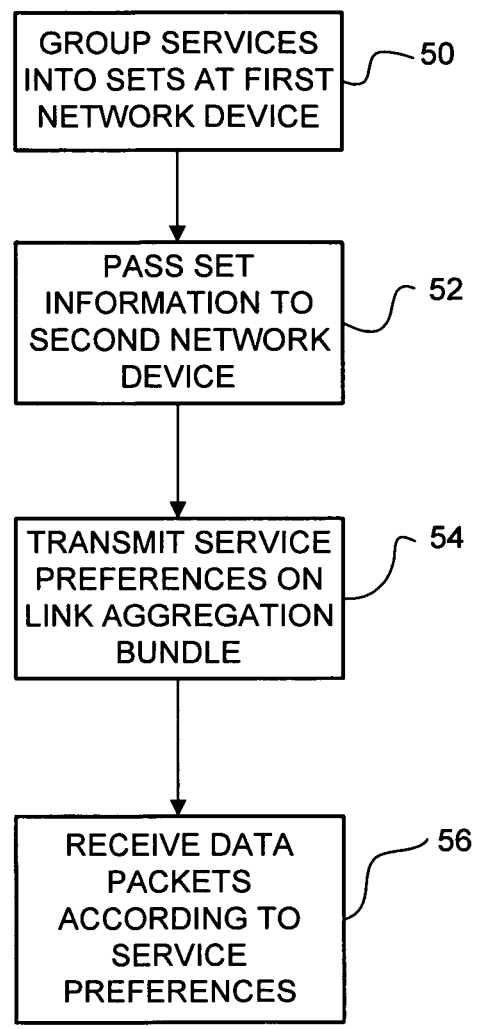
FIG. 5 is a flowchart illustrating a process for setting preferences for assigning services to physical links in a link bundle, in accordance with one embodiment.

FIG. 5 is a flowchart illustrating an overview of a process for transmitting preferences for assigning services to physical links in an aggregated link bundle, in accordance with one embodiment. At step 50, the services are grouped into sets at a first network device 10 (or virtual network device 12) (FIGS. 1, 2, and 5). A list of services assigned to each set is transmitted to a second network device (or virtual network device) at the other end of the link aggregation bundle 20 (step 52). The service preferences are transmitted in link aggregation protocol data units over the link aggregation bundle (step 54). The data is transmitted and received on the links according to the service preferences (step 56).

Although the method and apparatus have been described in accordance with the embodiments shown, one of ordinary skill in the art will readily recognize that there could be variations made to the embodiments without departing from the scope of the embodiments. Accordingly, it is intended that all matter contained in the above description and shown in the accompanying drawings shall be interpreted as illustrative and not in a limiting sense.

What is claimed is:

1. A method comprising:
receiving at a network device, a packet from a component in a virtual network device comprising at least two physical components each operating as a master component or a slave component, the packet transmitted across a link aggregation bundle connecting the virtual network device to the network device, the packet indicating if the component transmitting the packet is the master component in the virtual network device; and
determining at the network device if an error exists in operation of the component as the master component or the slave component, wherein determining if an error exists comprises determining if more or less than one of the components in the virtual network device are operating as the master component;
wherein the link aggregation bundle comprises a group of physical links operating as a single virtual link, and the virtual network device appears as a single network device to the network device.

2. The method of claim 1 wherein determining if an error exists comprises determining if there is a physical link connecting master components in the virtual network devices.

3. The method of claim 2 further comprising reconfiguring one or more of the components as the master component or the slave component if said error exists.

4. The method of claim 1 wherein the packet comprises a link aggregation protocol data unit.

5. The method of claim 4 wherein the packet comprises a first bit identifying the component as part of the virtual network device and a second bit indicating if the component is the master component.

6. The method of claim 1 further comprising transmitting an error notification if said error exists.

7. The method of claim 1 wherein the network device and the virtual network device are each located in a different service provider network and wherein each link in the link aggregation bundle comprises a network-network interface.

8. The method of claim 1 further comprising receiving a preference for assigning services to physical links in the link aggregation bundle.

9. An apparatus comprising:
a processor configured for processing a packet received from a component in a virtual network device comprising at least two physical components each operating as a master component or as a slave component, the packet transmitted across a link aggregation bundle for connecting the virtual network device to the apparatus, the packet indicating if the component transmitting the packet is the master component in the virtual network device, and determining if an error exists in operation of the component as the master component or the slave component, wherein determining if an error exists comprises determining if more or less than one of the components in the virtual network device are operating as the master component; and
memory for storing a status of the component as the master or slave component;
wherein the link aggregation bundle comprises a group of physical links operating as a single virtual link, and the virtual network device appears as a single network device to the apparatus.

10. The apparatus of claim 9 wherein determining if an error exists comprises determining if there is a physical link connecting the master components in the virtual network devices.

11. The apparatus of claim 9 wherein the packet is a link aggregation protocol data unit comprising a first bit identifying the component as part of the virtual network device and a second bit indicating if the component is the master component.

12. An apparatus comprising:
a processor for defining preferences for assigning services to physical links in an aggregated bundle of physical links connecting the apparatus to a network device, and transmitting a packet comprising said preferences to the network device; and
memory for storing said preferences;
wherein all packets associated with a given service are transmitted over the same physical link, and wherein at least one of the network device and the apparatus comprises a virtual network device comprising at least two physical components each operating as a master component or a slave component, and the other of the network device and the apparatus is operable to determine if an error exists in operation of the component as the master component or the slave component based on a packet received indicating if the component transmitting the packet is a master component in the virtual network device.

13. The apparatus of claim 12 wherein defining preferences comprises grouping said services into a plurality of sets and transmitting a list of said services associated with said sets to the network device.

14. The apparatus of claim 13 wherein said list of services associated with said sets is transmitted via a protocol message and the packet comprising said preferences comprises a link aggregation protocol data unit.

15. The apparatus of claim 12 wherein the packet further comprises an indication as to whether there is a preference that the service assignments are the same in both directions on the physical links.

16. The apparatus of claim 12 wherein said memory is further configured for storing preferences received from the network device for assigning services to the physical links.

17. The apparatus of claim 12 wherein the network device is a virtual network device and the processor is further configured for processing a packet received from a component in the virtual network device, the packet indicating if the component is a master component in the virtual network device, and determining if an error exists in operation of the component as the master component or a slave component.

* * * * *